US007425271B1

(12) United States Patent
Longo

(10) Patent No.: US 7,425,271 B1
(45) Date of Patent: Sep. 16, 2008

(54) METHOD FOR TREATING SLUDGE

(76) Inventor: Robert Longo, 71 Roxiticus Rd., Far Hills, NJ (US) 07931

( * ) Notice: Subject to any disclaimer, the term of this patent is extended or adjusted under 35 U.S.C. 154(b) by 309 days.

(21) Appl. No.: 11/265,753

(22) Filed: Nov. 3, 2005

(51) Int. Cl.
*C02F 11/14* (2006.01)

(52) U.S. Cl. .................. 210/743; 210/738; 210/739; 210/764; 71/12

(58) Field of Classification Search ............. 210/743
See application file for complete search history.

(56) References Cited

U.S. PATENT DOCUMENTS

| 4,046,689 | A | * | 9/1977 | Argyll | ............................. 71/12 |
| 4,082,672 | A | * | 4/1978 | Petroski | ........................ 210/205 |
| 4,721,392 | A | * | 1/1988 | Fries et al. | .................... 366/241 |
| 4,925,571 | A | * | 5/1990 | Jacob et al. | .................... 210/742 |
| 5,013,458 | A | * | 5/1991 | Christy et al. | .......... 405/129.27 |
| 5,055,204 | A | * | 10/1991 | Bogart | .......................... 210/758 |
| 5,163,800 | A | * | 11/1992 | Raisio | ........................... 414/500 |
| 5,490,741 | A | * | 2/1996 | Fryer | ..................... 405/128.75 |
| 5,603,842 | A | * | 2/1997 | Whitaker et al. | ............. 210/743 |
| 6,391,192 | B1 | * | 5/2002 | Haag | .......................... 210/96.1 |
| 6,808,636 | B2 | * | 10/2004 | Ward et al. | ................... 210/710 |

* cited by examiner

*Primary Examiner*—Peter A. Hruskoci
(74) *Attorney, Agent, or Firm*—Thomas L. Adams

(57) ABSTRACT

Sludge can be treated by placing it in a carrier sized for bulk shipment of sludge by road or by rail. An antipathogenic substance such as lime is mixed into the sludge located in the carrier in order to treat pathogens in the sludge. At least one mixer adapted for mixing sludge throughout the carrier is employed. A dispenser such as a conduit or a loader bucket can dispense the antipathogenic substance so that the mixer can mix the substance with the sludge. The sludge is transported in the carrier either before or after the mixing with the antipathogenic substance. The mixture of sludge and antipathogenic substance is allowed to remain in the carrier long enough to treat pathogens with the substance before unloading the sludge from the carrier at a destination established for utilization, storage, transfer or disposal of the sludge.

18 Claims, 3 Drawing Sheets

METHOD FOR TREATING SLUDGE

BACKGROUND OF THE INVENTION

1. Field of the Invention

The present invention relates to methods and apparatus for treating sludge, and in particular to mixing apparatus and transportation methods.

2. Description of Related Art

Plants such as wastewater treatment plants produce a sludge that normally requires processing before disposal or use as a fertilizer. The sludge has a high level of pathogens such as hazardous bacteria and viruses. These pathogens need to be eliminated before using the sludge as a fertilizer. For this reason, many wastewater treatment plants employ a digester, a large vessel where benign bacteria is released to spread and destroy the pathogens.

In some circumstances, instead of bacteria, an alkaline substance such as lime is mixed with the sludge to destroy pathogens. Current regulations require initially raising the pH of the sludge to at least 12 so as to keep the pH at least 12 for at least 2 hours without the need to add more alkaline substance. On the other hand, where the sludge is used as a fertilizer, excessive alkalinity may be unacceptable because of the tendency to harm vegetation. Also, excessive alkalinity can dry the sludge and cause caking, making the sludge difficult to handle.

Some treatment plants do not have the ability or capacity to digest the sludge or treat it with lime. Bacterial digestion of sludge may take more than 20 days and a facility may lack adequate capacity for keeping sludge for such an extended time period. In such cases untreated or partially treated sludge must be shipped and possibly treated elsewhere. Shipping sludge that has not been fully treated requires special precautions. Also, this sludge is putrescent and its odor can draw objections from any vicinity through which it passes or arrives.

Upon arrival at a destination, treatment of the sludge typically requires several time-consuming and costly steps. The sludge is often unloaded, transferred to a pug mill where lime is mixed with the sludge, unloaded from the mill, placed in the windrow for at least 24 hours to complete the stabilization, and then carried to a site to be spread as fertilizer. Besides the high costs associated with handling sludge at the destination, there are even higher costs associated with getting permits for mixing/stabilizing the untreated or partially treated sludge at the destination. In many cases obtaining permits will be so difficult as to make treatment at the destination impractical.

U.S. Pat. No. 4,925,571 concerns a method for heat pasteurization of sewage sludge during shipment by rail, truck, ship, etc. Waste heat from the vehicle propulsion system is used for the heating. The pasteurized sludge is eventually used as fertilizer. The process requires that the sludge be heated to a specific temperature for a specific period of time sufficient to reduce the presence of pathogens within the sludge, but not induce dewatering of the material.

U.S. Pat. No. 5,971,600 concerns a mobile trailer for combining waste material (sewage sludge or other biological waste) with a stabilizing material such as lime. Waste material placed in a reservoir, and stabilizer placed in another reservoir are fed to a plow blender for mixing the waste material and stabilizer. The mixture is then discharged from the trailer.

U.S. Pat. No. 5,441,640 concerns a transportable plant for treating biological waste in a manner much like a municipal-type treatment process. The plant employs bacteria to digest waste material in a holding tank which contains an oxygen injection system. Pumps are used to draw water from one tank to the next and to draw wastewater into the wastewater holding tank.

U.S. Pat. No. 5,490,741 concerns a mobile apparatus for the metered blending of sludge or other material with dry or liquid stabilizing compounds. The particle size of introduced biological sludge material is adjusted by means of vibratory screens and/or flailing chains prior to entering a retention bin. The sludge is then combined with a stabilizing element within a mixing chamber. The mixing chamber contains a mixing element such as an auger-type screw apparatus which both mixes the sludge and lime and moves the material through to a discharge opening.

U.S. Pat. No. 3,772,188 concerns the pretreatment of sewage or other biological waste. An intermediate treatment process occurs in a conduit where raw material is being piped from a source of origin to point of treatment. The apparatus consists of a pressurized vessel containing a lower portion, which holds the standing sewage, and an upper portion where the standing sewage is injected and where it is subjected to processes, which both break-up and aerate the sewage particles. This process is meant to expose the sewage particles to high purity oxygen, which is pumped into the vessel under pressure. The reference discusses treating the pH of the effluent before discharge.

U.S. Pat. No. 5,013,458 concerns a device and method for reducing the presence of pathogens within a biological waste substance, such as sewage sludge. In this reference, a chemical reagent such as lime is mixed with the sludge material in order to raise the temperature and pH of the material, which in turn, kills the pathogens. In order to properly blend the chemicals and waste material, the material is passed through a narrow chamber by means of a helically shaped screw.

In U.S. Pat. No. 5,681,481 liquid sludge and lime or other caustic material are thoroughly mixed within a container to increase the pH of the sludge to a desired level and hold the material at that pH for a predetermined period of time. A device such as an auger blends the sludge.

In U.S. Pat. No. 4,226,712 a liquid waste is treated with lime to kill pathogens and partially dry the substance within an initial reaction chamber. The resulting substance is subsequently discharged to a secondary chamber which constitutes a drying kiln surrounded by a furnace which produces the heat for the drying process. In a preferred embodiment, an auger or screw-type conveyor is utilized to move the liquids from the lime treatment reactor to the drying kiln.

U.S. Pat. No. 6,776,914 concerns a process for treating liquid septage or other biological waste in which an alkaline material is added to a volume of wastewater in order to raise the pH of the mixture. The alkaline/wastewater mixture is subsequently stored for a period of time before it is subjected to further treatment methods including flocculation, de-watering, and pasteurization, at which point, the material may be used as fertilizer without requiring further permits.

In U.S. Pat. No. 5,275,733, a process can stabilize a dewatered wastewater sludge with an acidic or basic substance that creates a slightly elevated pH condition within the sludge material. This treatment stabilizes the sludge which reduces pathogens and odors, but allows for the rapid maturation of microbial activity in subsequent treatment processes.

U.S. Pat. No. 6,808,305 concerns preparing a sludge or other biological waste material for dewatering by mixing additives with the sludge utilizing an in-line power-blending device. This method entails the introduction of a stream of fluid additive such as an adhesive to flowing sewage sludge or other mixture. The device is to be fed by a sludge-pumping device which pumps sludge into the blending device. An additive is also pumped into the device at a pre-measured rate. The sludge and additive are then forced through a chamber containing an impeller blade which thoroughly blends the two constituents. The mixture is then discharged from the device to the dewatering equipment.

SUMMARY OF THE INVENTION

In accordance with the illustrative embodiments demonstrating features and advantages of the present invention, there is provided an antipathogenic method for treating sludge in a carrier. The method includes the step of placing the sludge in the carrier. Another step is mixing an antipathogenic substance into the sludge while in the carrier in order to treat pathogens in the sludge. The method includes the step of transporting the sludge in the carrier before or after the mixing of the antipathogenic substance. Another step is allowing the mixture of sludge and antipathogenic substance to remain in the carrier long enough to treat pathogens with the antipathogenic substance before unloading the sludge from the carrier at a destination established for utilization, storage, transfer or disposal of the sludge.

In accordance with another aspect of the invention, there is provided apparatus for treating sludge in a carrier sized for bulk shipment of sludge by road or by rail. The apparatus includes at least one mixer adapted for mixing sludge throughout the carrier. Also included is a dispenser for dispensing an antipathogenic substance into said carrier to allow said mixer to mix the antipathogenic substance with the sludge.

By employing apparatus and methods of the foregoing type, untreated or partially treated sludge may be mixed with an antipathogenic substance before or after shipment. In one embodiment, a mixer having a plurality of augers is thrust into the sludge while the sludge is in a truck or an open shipping container. An antipathogenic substance such as lime is placed in the sludge using either heavy construction equipment or by sending lime (air-entrained particles, a liquid or slurry) through conduits that discharge next to the augers. The mixing apparatus can be a freestanding dedicated unit or a mobile unit that can be carried to a worksite and thrust into the sludge by means of heavy construction equipment such as a front-end loader or forklift truck.

This process may be conveniently performed at a site where the sludge originates and where no permits will be needed. Also, the mixing can be performed right in the shipment carrier so that no additional handling is needed to move the sludge from a mixing site to that shipment carrier. Accordingly, the shipment carrier can be immediately used to transport the sludge by truck or by rail. In some cases, the carrier may be a container that can be brought by truck to a rail yard and transferred to a rail car.

Furthermore, the travel time will be used advantageously in that the sludge will be stabilized during transit and be ready for disposal or for spreading as fertilizer by the time it reaches the destination, thereby eliminating treatment and handling at the destination and the need for permits at the destination.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
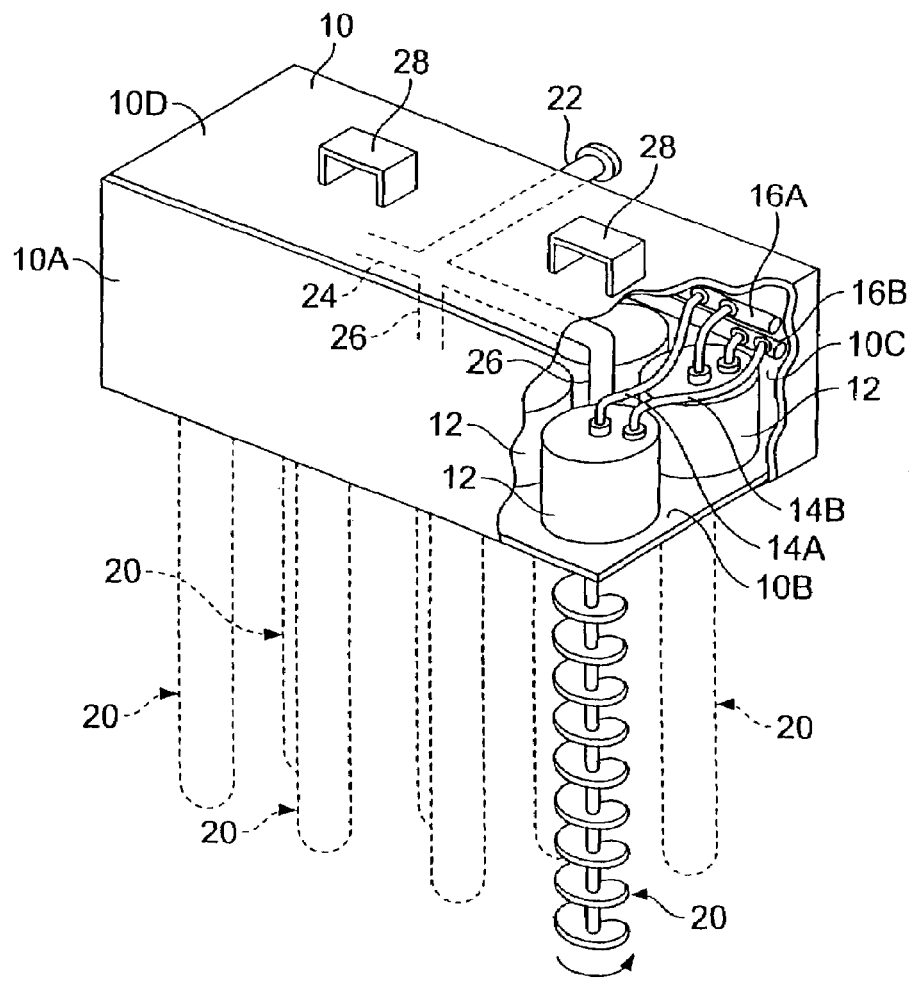
FIG. 1 is a perspective view of a mixer and dispenser of antipathogenic substance in accordance with principles of the present invention.
Figure 2:
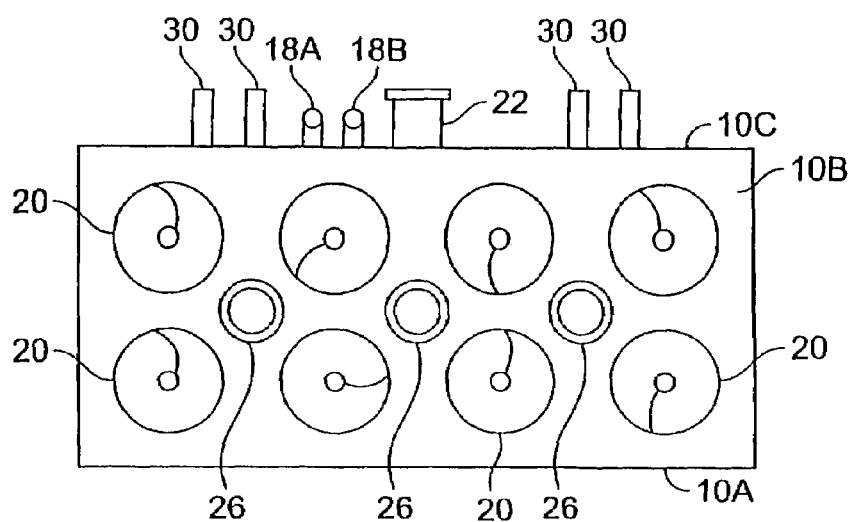
FIG. 2 is a bottom view of the apparatus of FIG. 1.

Referring to FIGS. 1 and 2, a mobile mixer is shown with a support assembly 10 in the form of a rectangular steel box. Box 10 may have a front access panel 10A that may be released by removing bolts (not shown). In some embodiments panel 10A may swing on a hinge (not shown). In still other embodiments, support assembly 10 may be an open frame allowing uninterrupted access to the assembly's interior.

Mounted on the floor 10B of assembly 10 are eight hydraulic motors 12 arranged in two rows of four, although a different number and pattern can be used in other embodiments. Each of the motors 12 are powered through their respective hydraulic lines 14A and 14B, which connect from the motor to manifolds 16A and 16B, respectively. Manifolds 16A and 16B communicate with hydraulic fittings 18A and 18B, respectively, which both project through rear panel 10C of assembly 10. Accordingly, hydraulic fluid circulating through lines 14A and 14B will power each of the hydraulic motors 12. Reversing the fluid flow direction will reverse the direction of rotation of the motors 12.

The drive shaft of each of the hydraulic motors 12 is axially connected to an auger 20 arranged to mix sludge in a manner to be described presently. Auger 20 may be six feet (1.83 m) long, 18 inches (46 cm) in diameter, and have nine turns, although these dimensions may be changed for other embodiments, depending upon the number of augers, the amount and depth of sludge, the speed of rotation, etc. In some cases, the augers will be arranged to mix sludge in a container that may be between 20 to 45 feet (2.4 to 13.7 meters) long and approximately 8 to 10 feet (2.4 to 3.0 meters) wide.

Figure 4:
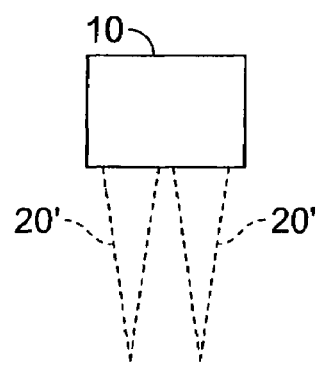
FIG. 4 is a schematic view of an apparatus that is an alternate to that shown in FIG. 1.
Figure 5:
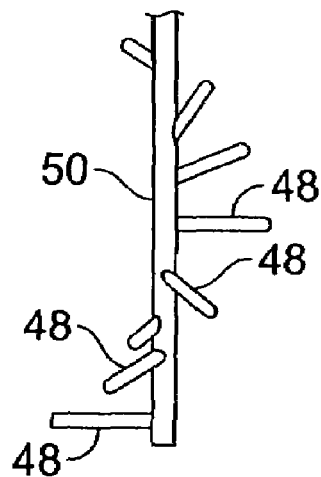
FIG. 5 is a perspective view of a fragment of a mixing implement that is an alternate to that shown in FIGS. 1 and 4.
Figure 6:
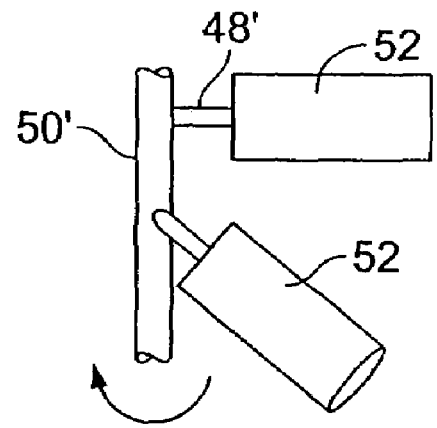
FIG. 6 is a perspective view of a fragment of a mixing implement that is an alternate to that shown in FIGS. 1, 4 and 5.

Moreover, embodiments are contemplated where the augers are tapered. For example, in FIG. 4 assembly 10 is shown fitted with a plurality of tapered augers 20'. In the embodiment of FIG. 5, the augers are replaced with stirring bars 48 that are mounted in a spiral staircase pattern on a central drive shaft 50. The modified stirring bars 48' mounted on drive shaft 50' in the embodiment of FIG. 6 are fitted, with vanes 52 designed to provide more efficient, directional mixing. Also, other mixers are contemplated such as blades or buckets that circulate on an endless conveyor belt or chain.

Figure 7:
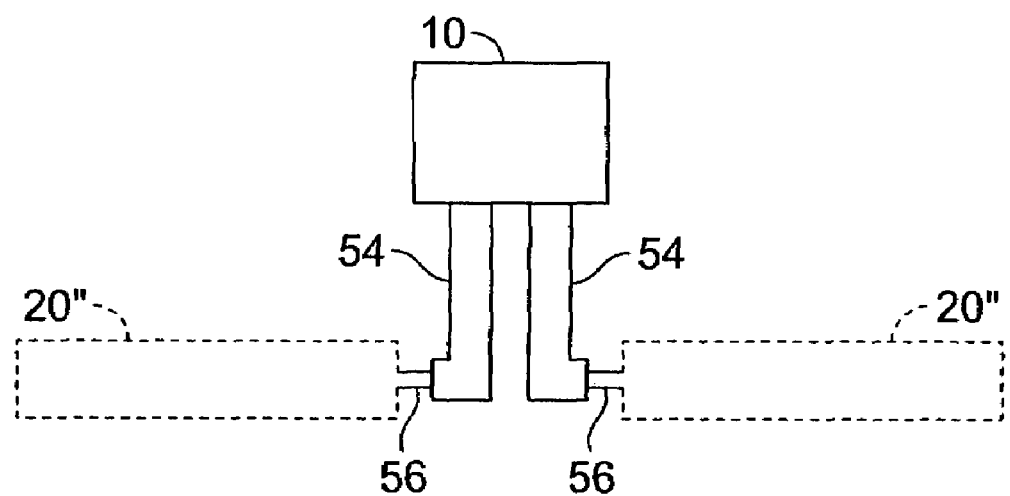
FIG. 7 is a schematic view of an apparatus that is an alternate to that shown in FIGS. 1-6.

Referring to FIG. 7, previously mentioned assembly 10 is fitted with horizontally disposed augers 20". These augers are similar to those previously illustrated but their drive shafts 56 are attached to right angle drives 54 attached to the underside of assembly 10.

While individual hydraulic motors 12 are illustrated in FIG. 1, in some embodiments only a single, highly rated hydraulic motor will be used in place of the illustrated multiple motors 12. In such case, each of the augers 20 will be synchronously driven by a common drivetrain such as a train of intermeshed years, a number of endless chains, or the like. In other embodiments the hydraulic motor(s) can be replaced by one or more electric motors.

Referring again to FIG. 1, means are provided in assembly 10 for delivering an antipathogenic substance such as lime or other alkaline substance. Specifically, a feed conduit 22, operable as a dispenser, communicates with a transverse conduit 24, which supplies three descending tributary ducts 26 that project through bottom panel 10B.

Assembly 10 can be lifted by heavy mobile equipment such as a forklift truck, front end loader, crane, or the like. A pair of coupling arches 28 mounted on top panel 10D are sized to receive the tines of a forklift. Two pairs of bearing plates 30 mounted on the back of rear panel 10C are arranged as a Balderson coupling for a front end loader, although other types of couplings and bearings may be offered for different types of heavy construction or earthmoving equipment. It will be appreciated that in some embodiments assembly 10 can be mounted on a dedicated gantry for moving the mixer assembly vertically and horizontally.

Figure 3:
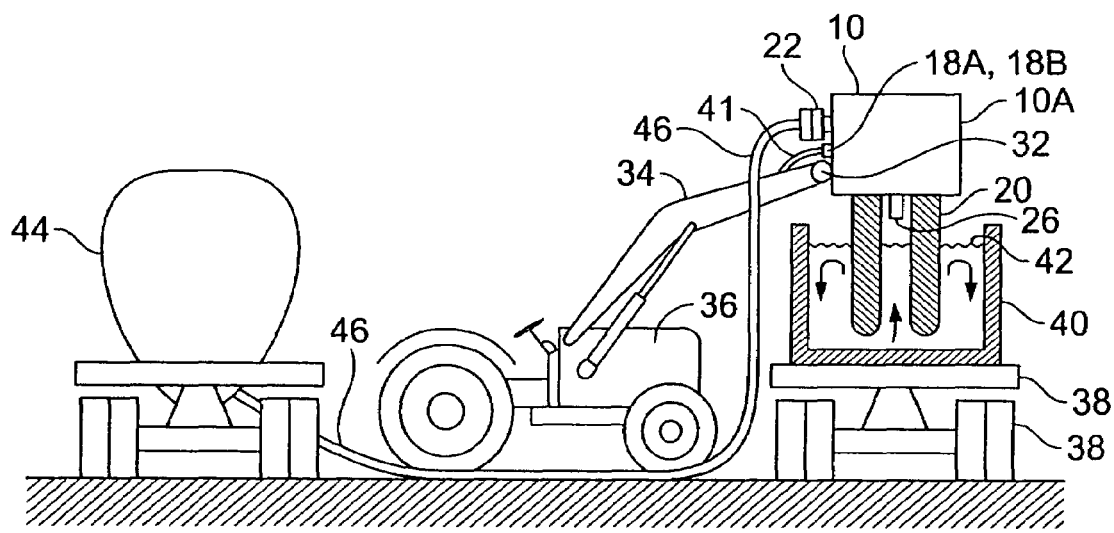
FIG. 3 is an elevational view of the apparatus of FIG. 1 being employed to mix antipathogenic substance from a truck with sludge in a carrier.

To facilitate an understanding of the principles associated with the foregoing apparatus, its operation will be briefly described. Referring to FIG. 3, previously mentioned mobile mixer 10 is attached by its bearing plates (plates 30 of FIG. 2) to shaft 32 on the distal end of loader arms 34 of loader 36. The assembly 10 can be attached while resting on a simple storage cradle (not shown) or while laying with its front face 10A down. Assembly 10 will be attached to arms 34 and will use the usual hydraulic cylinders so an operator can change the angular orientation of augers 20.

Loader 36 also has hydraulic lines 41 typically provided for powering hydraulic accessories in a known manner. Hydraulic lines 41 are attached to previously mentioned fittings 18A and 18B, on the back of assembly 10 in order to power the previously mentioned hydraulic motors 12 (FIG. 1).

It will be appreciated that instead of using a loader, a forklift truck can insert its tines through arches 28 (FIG. 1) in order to lift assembly 10. Instead of a forklift truck or loader 36, assembly 10 can be carried by a crane or other types of heavy mobile equipment.

Once supported on arms 34 as shown in FIG. 3, loader 36 can bring assembly 10 to the vicinity of truck 38. In FIG. 3 truck 38 is already loaded with a carrier, shown in this case as an open container filled with sludge 42. This container may have a back gate with rubber seals. In other instances, the truck itself may be a carrier; for example, an open dump truck.

In some cases sludge 42 will have been partially treated. Also, in some case the sludge will have been dewatered by conventional means such as screens, pressure belts, centrifuges, or the like. Still, some sludge may arrive untreated and without having been dewatered.

The sludge will normally be handled at the site of origin (e.g., a wastewater treatment plant), but in some cases may have arrived by truck at some common waystation for treatment.

The weight of sludge 42 will have already been weighed in a conventional manner (e.g., weighing the truck 38 before and after loading with sludge). Also, the pH of the sludge 42 will be measured in a conventional manner. After sludge 42 is loaded in carrier 40, an alkaline substance such as lime may be dumped on top of sludge 42 by the bucket on a front end loader (not shown) or by other heavy equipment. The weight of alkaline substance in the bucket can be measured by known bucket transducers (not shown) in order to control the dosing of the sludge 42. Alternatively, the increase in truck weight caused by loading the alkaline substance can be measured instead.

Instead of dumping alkaline substance in carrier 40 as mentioned above, in the embodiment of FIG. 3 an alkaline substance, namely granular lime, may be delivered from a tanker truck 44 in a manner to be described presently.

Arms 34 of loader 36 can raise assembly 10, and if necessary, tilt augers 20 so they clear the upper edge of carrier 40 and can be inserted into sludge 42. An operator can then use arms 34 to lower augers 20 into sludge 42. Insertion of the augers 20 can be facilitated by powering motors 12 (FIG. 1) to screw augers 20 into the sludge 42.

It will be assumed now that lime is delivered not by a loader bucket but only from truck 44. Truck 44 is outfitted with a flexible hose 46 for delivering lime from truck 44. Hose 46 is attached to conduit 22 as shown. In a known manner, a blower (not shown) on truck 44 can blow lime particles through hose 46. Accordingly, air-entrained lime particles travel in an airstream through hose 46 into conduit 22 of assembly 10. The lime particles travel through conduit 24 (FIG. 1) and are discharged through the three tributary ducts 26 emerging from the underside of assembly 10. In other embodiments, the alkaline substance may be delivered through conduit 22 in the form of a liquid or slurry.

Hydraulic power supplied through lines 41 will spin motors 12 to rotate augers 20, which will be rotated in the direction shown in FIG. 1 to lift sludge 42. The augers 20 will mix sludge 42 with the alkaline substance discharged from ducts 26. Truck 44 will typically have equipment for measuring the weight of alkaline substance blown through hose 46. (Alternatively, a decrease in truck weight can be used to measure the weight of material delivered.) Lime (or other alkaline or antipathogenic substance) is conveyed through hose 46 until a predetermined weight of lime is delivered. The target weight is chosen to achieve a predetermined concentration of alkaline substance, typically 10% to 20% by weight (for example, four tons of lime can be mixed with 20 tons of sludge). The concentration will be adjusted depending upon the pH measured initially, before adding the alkaline substance. Thus if the initial pH is already relatively high, less alkaline substance will be added, and vice versa.

After the desired weight of alkaline substance is delivered, the mixing with augers 20 continues to complete an overall mixing time of 5-10 minutes (although other mixing times are contemplated depending upon the volume and viscosity of the sludge, the efficiency of the augers, and other factors). The pH of the sludge/lime mixture is then measured to determine whether it will satisfy the pertinent regulations for treating sludge. Current regulations require initially raising the pH of the sludge to at least 12 in order to keep the pH at least 12 for at least 2 hours without the need to add more alkaline substance. If necessary, additional alkaline substance can be delivered from truck 44 to raise the pH. If on the other hand the pH is already high, an appropriate acidic substance can be added and then mixed into the sludge 42 with augers 20. The pH can then be remeasured to verify its appropriateness. In many instances the pH will must not become too high and thus render the lime/sludge mixture unsuitable as fertilizer.

Next, loader 36 can raise its arms 34 to lift augers 20 out of the sludge mixture 42. If necessary, the augers 20 can be rotated in reverse to unscrew them from the sludge mixture 42. Also if necessary, augers 20 can be tilted to clear the sides of carrier 40. In some cases the augers 20 will be hosed with water. Carrier 40 can then be covered with a tarp or other sheet that is secured in place in order to prevent loss of material and excess discharge of putrescent odors. Once truck 38 leaves, another truck carrying a container filled with sludge can then move under augers 20 and the process just described can be repeated with this new load of sludge.

If on the other hand, no further sludge is to be treated, hose 46 can be disconnected from conduit 22. Thereafter, loader 36 can carry assembly 10 to a storage location where shaft 32 and couplings 18A and 18B can be disconnected.

Should assembly 10 be needed now or later at other sites, loader 36 can bring assembly 10 to successive sites where its services can be used. If this new site is at some distance, assembly 10 can be transported by truck, rail, or other means.

In the meantime, previously mentioned truck 38 transports the sludge/lime mixture in carrier 40 to another location. In some cases truck 38 will bring carrier 40 to a rail line where carrier 40 will be lifted and loaded onto a rail car using known equipment and techniques. Carrier 40 is in this case a container with corner locks to allow stacking.

In any event the carrier 40 will eventually arrive at an ultimate destination, most typically making the final leg of its journey by truck. The time taken to transport the lime/sludge mixture will allow for complete treatment of pathogens in the sludge. Normally, the treatment will be complete after about 24 hours.

At the final destination the treated sludge can be removed from the carrier in a conventional manner and spread on fields as fertilizer. In some instances the sludge will be disposed in a landfill. While the elimination of pathogens is less important in landfills, treatment may nevertheless be important in order to reduce the emission of putrescent odors along the shipment route.

It is appreciated that various modifications may be implemented with respect to the above described, preferred embodiments. In some cases an antipathogenic substance can be added while the mixer is in the sludge by means of a hose or chute separate from the mixer that discharges directly to the sludge air-entrained particles, a liquid, or a slurry. Alternatively, an antipathogenic substance can be delivered to the carrier by a conveyor belt or elevator before or after deployment of the mixer. Also, the sludge and antipathogenic substance may be delivered to the carrier during overlapping time intervals, either before or during mixing. In some instances the mixer may cover a large enough region so as to service the entire contents of the carrier at the same time, but in some cases a smaller mixer may be circulated horizontally so that all regions in the carrier are eventually serviced. Also, instead of using an auger, mixing may be performed by vertical rods that are moved horizontally along a closed path.

Obviously, many modifications and variations of the present invention are possible in light of the above teachings. It is therefore to be understood that within the scope of the appended claims, the invention may be practiced otherwise than as specifically described.

The invention claimed is:

1. An antipathogenic method for treating sludge in a carrier with a mixer comprising the steps of:
   placing the sludge in the carrier;
   mixing with said mixer an antipathogenic substance into the sludge while in the carrier in order to treat pathogens in the sludge;
   transporting the sludge in said carrier before or after the mixing of the antipathogenic substance, wherein said mixing includes lowering said mixer into the sludge in the carrier, and lifting said mixer out of the sludge in the carrier to form a mixture of sludge and antipathogenic substance; and
   allowing the mixture of sludge and antipathogenic substance to remain in the carrier long enough to treat pathogens with the antipathogenic substance before unloading the sludge from the carrier at a destination established for utilization, storage, transfer or disposal of the sludge.

2. A method according to claim 1 comprising the step of:
   bringing the carrier by truck to a rail car before moving the carrier onto the rail car.

3. A method according to claim 1 comprising the step of:
   using the sludge that has been unloaded from the carrier as fertilizer.

4. A method according to claim 1 wherein the step of mixing antipathogenic substance is performed with an alkaline substance for raising the pH to a level that is effective to treat pathogens in the sludge.

5. A method according to claim 4 wherein the pH of the sludge mixture is increased to at least 12.

6. A method according to claim 5 wherein the step of mixing alkaline substance is performed by initially adding alkaline substance in sufficient quantity to keep the pH of the sludge mixture at least 12 for at least two hours without the need to add additional alkaline substance.

7. A method according to claim 5 wherein the pH of the sludge mixture is increased but not to an extent rendering the sludge unsuitable for use as a fertilizer.

8. A method according to claim 4 comprising the step of:
   determining the weight of the sludge in the carrier, the step of mixing an alkaline substance being performed by adding a weight of alkaline substance in a predetermined proportion to the weight of the sludge in the carrier.

9. A method according to claim 8 wherein the step of mixing an alkaline substance is performed by delivering the alkaline substance to the carrier from a vehicle and weighing the alkaline substance either directly or by measuring weight changes in the vehicle.

10. A method according to claim 8 wherein the step of mixing an alkaline substance is performed by entraining alkaline substance in an airstream flowing to said sludge.

11. A method according to claim 8 wherein the step of mixing an alkaline substance is performed by adding the alkaline substance in the proportion of 10% to 20% of the weight of the mixture.

12. A method according to claim 1 comprising the steps of:
   measuring the pH of the sludge around the beginning and around the end of the step of mixing the antipathogenic substance into the sludge.

13. A method according to claim 12 wherein the antipathogenic substance is lime and wherein the step of mixing is performed with a plurality of augers.

14. A method according to claim 1 wherein the treatment of pathogens in the sludge is performed without reliance on bacterial digestion.

15. A method according to claim 1 comprising the step of:
   dewatering the sludge before placement in the carrier.

16. A method according to claim 1 employing a mobile mixer and wherein the step of mixing the antipathogenic substance is performed with the mobile mixer, the method comprising the step of:
   bringing the mobile mixer to successive sites to accommodate demand for mixing.

17. A method according to claim 1 employing a mobile mixer and separate heavy mobile equipment, and wherein the step of mixing the antipathogenic substance is performed with the mobile mixer, the method comprising the step of:
   lifting the mobile mixer over the carrier with the heavy mobile equipment.

18. A method according to claim 17 wherein the mobile mixer is powered hydraulically by said heavy mobile equipment.

* * * * *